US012601622B2

(12) United States Patent (10) Patent No.: US 12,601,622 B2

Augenstein (45) Date of Patent: Apr. 14, 2026

(54) ACOUSTIC ISOLATORS FOR GAS TRANSDUCERS

(71) Applicant: Tancy Instrument Group Co., LTD., Wenzhou (CN)

(72) Inventor: Don Augenstein, Grand Rapids, MI (US)

(73) Assignee: Tancy Instrument Group Co., LTD., Wenzhou (CN)

( * ) Notice: Subject to any disclaimer, the term of this patent is extended or adjusted under 35 U.S.C. 154(b) by 470 days.

(21) Appl. No.: 18/235,307

(22) Filed: Aug. 17, 2023

(65) Prior Publication Data

US 2024/0060805 A1 Feb. 22, 2024

Related U.S. Application Data

(60) Provisional application No. 63/398,738, filed on Aug. 17, 2022.

(51) Int. Cl.
 G01F 1/66 (2022.01)
 G01F 1/667 (2022.01)
(52) U.S. Cl.
 CPC .............. G01F 1/662 (2013.01); G01F 1/667 (2013.01)
(58) Field of Classification Search
 USPC ...................................................... 73/861.28
 See application file for complete search history.

(56) References Cited

U.S. PATENT DOCUMENTS

| | | | | | |
|---|---|---|---|---|---|
| 3,771,117 A | * | 11/1973 | Shaffer | .................... | G01F 1/662 |
| | | | | | 310/345 |
| 2012/0125121 A1 | * | 5/2012 | Gottlieb | .................. | G01F 1/665 |
| | | | | | 73/273 |
| 2021/0148741 A1 | * | 5/2021 | Nielsen | .................... | G01F 1/667 |

FOREIGN PATENT DOCUMENTS

EP 2449552 B1 * 4/2015 ............. G01F 1/662

OTHER PUBLICATIONS

Translation of EP-2449552-B1 (Year: 2015).*
International Search Report and Written Opinion dated Nov. 9, 2023 for corresponding International Application No. PCT/US2023/030511.

* cited by examiner

*Primary Examiner* — Nathaniel T Woodward
(74) *Attorney, Agent, or Firm* — Tucker Ellis LLP

(57) ABSTRACT

An isolation mounting for an ultrasonic transducer that includes at least one metal isolation washer and/or a metal load bearing nut. The isolation washer and load bearing nut include raised protrusions on a top surface that minimize the contact area between the transducer and a transducer housing in a body of an ultrasonic flowmeter in which the transducer is installed. The isolation mounting interrupts propagation of acoustic energy through the isolation mounting and reduces solid body noise transmission along paths outside a fluid flow through which the ultrasonic transducer is transmitting.

20 Claims, 16 Drawing Sheets

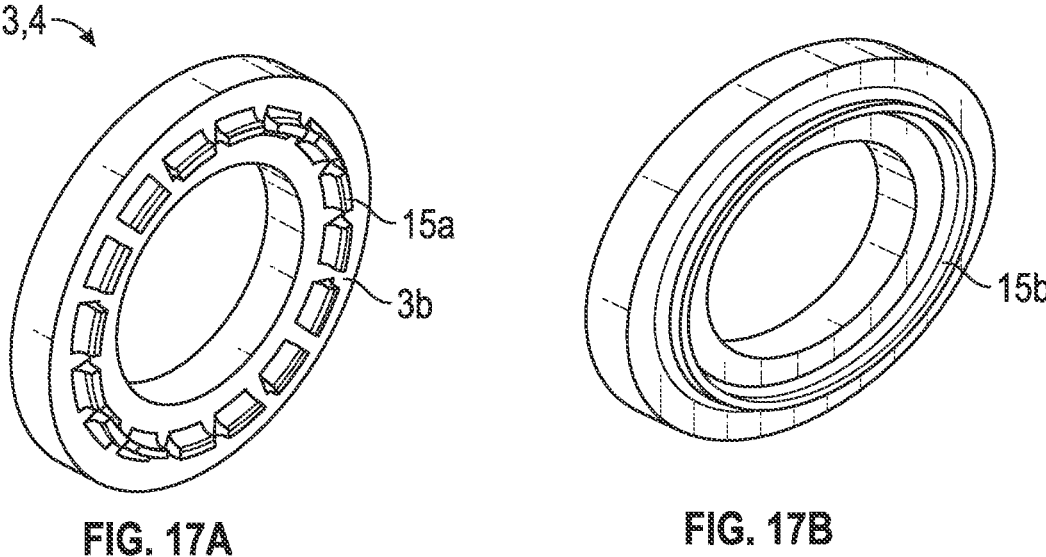
FIG. 17A
FIG. 17B
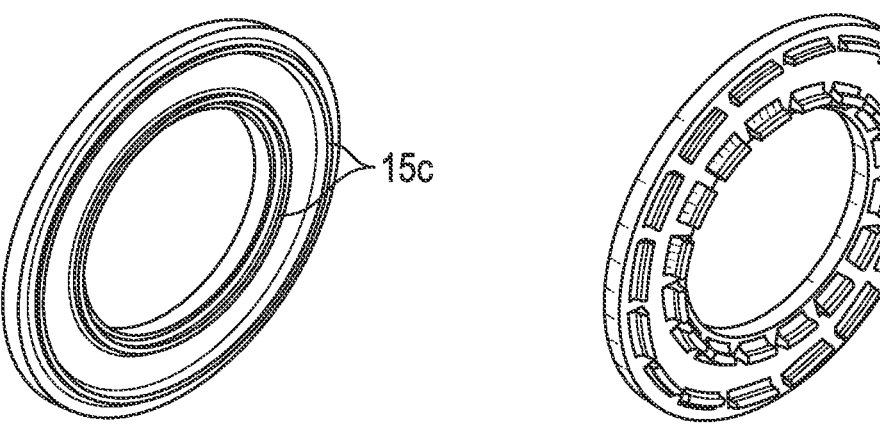
FIG. 17C
FIG. 17D

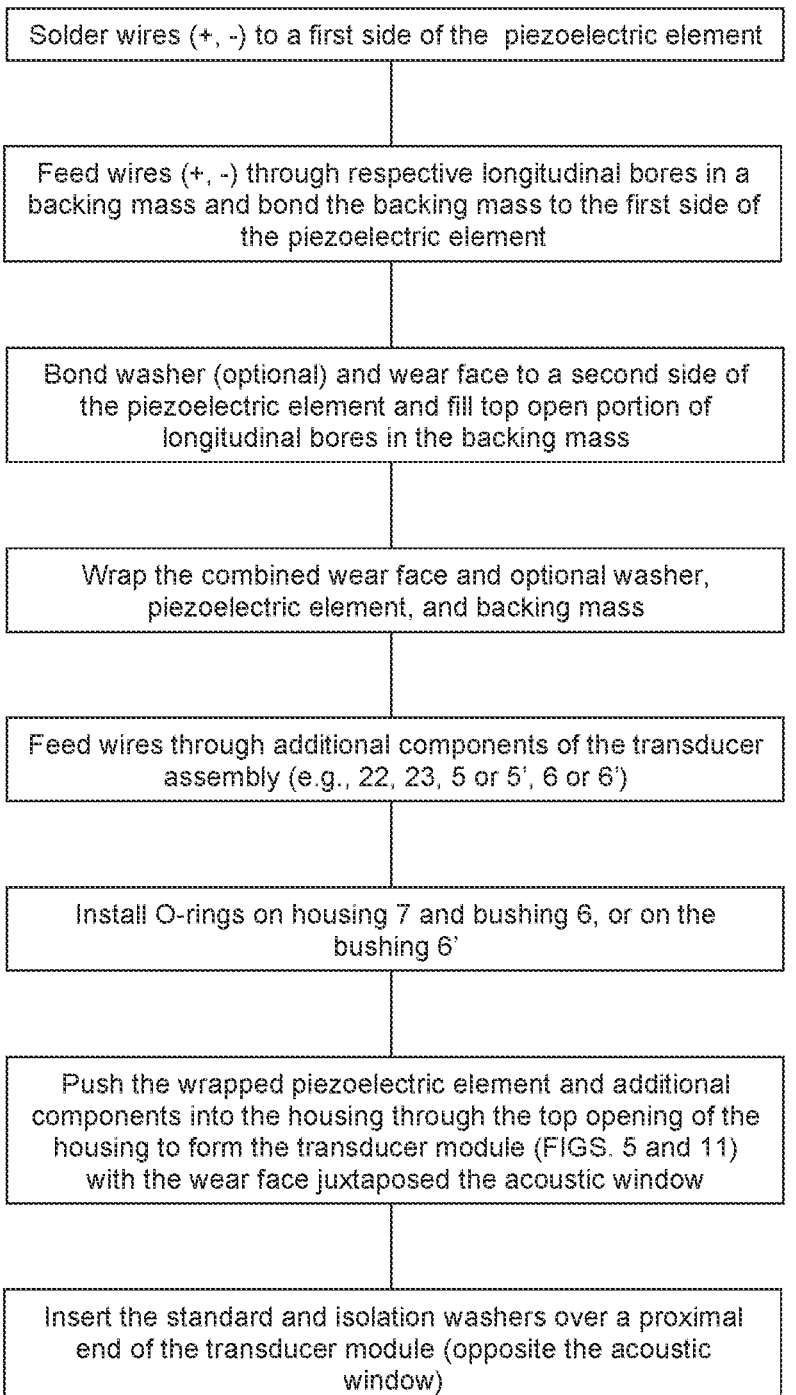

Solder wires (+, -) to a first side of the piezoelectric element

Feed wires (+, -) through respective longitudinal bores in a backing mass and bond the backing mass to the first side of the piezoelectric element Bond washer (optional) and wear face to a second side of the piezoelectric element and fill top open portion of longitudinal bores in the backing mass Wrap the combined wear face and optional washer, piezoelectric element, and backing mass Feed wires through additional components of the transducer assembly (e.g., 22, 23, 5 or 5', 6 or 6')

Install O-rings on housing 7 and bushing 6, or on the bushing 6'

Push the wrapped piezoelectric element and additional components into the housing through the top opening of the housing to form the transducer module (FIGS. 5 and 11) with the wear face juxtaposed the acoustic window Insert the standard and isolation washers over a proximal end of the transducer module (opposite the acoustic window)

FIG. 19

ACOUSTIC ISOLATORS FOR GAS TRANSDUCERS

CROSS-REFERENCE TO RELATED APPLICATIONS

This application claims priority to U.S. Provisional Application No. 63/398,738, filed on Aug. 17, 2022, which is incorporated herein by reference in its entirety.

FIELD OF THE INVENTION

This disclosure generally relates to devices, systems, and methods for acoustically isolating transducers, such as transducers used in transit time ultrasonic flow meters, and to ultrasonic flow meters that include acoustically isolated transducers.

BACKGROUND

In ultrasonic gas measurement, such as using transit time ultrasonic flow meters, the flow rate of a fluid (gas or liquid) contained in an enclosure such as a pipe or pipeline is measured. Typically, a transducer is secured in a mounting assembly that is fixed to a meter body positioned in-line with the pipeline, or that is part of a wedge that is attachable to an outer surface of the pipeline. The transducer propagates ultrasonic signals through the fluid flowing in the meter body or pipeline. For example, in one implementation, an input voltage is applied to a transmitting transducer (transmitter) to cause it to transmit ultrasonic waves into the medium. These waves are received by a receiving transducer (receiver) and converted into an output voltage. The "time of flight" of the waves is determined by comparing the time at which the input voltage is applied to the time at which the output voltage is received.

The time required for an ultrasonic signal to travel against the flow (i.e., upstream) is longer than that required to travel with the flow (i.e., downstream), and the difference between the upstream and downstream traveling times, $\Delta t$, is directly proportional to the flow velocity. The measurements of these travel times and $\Delta t$ relies on the quality of the received ultrasonic signal, e.g., the signal-to-noise ratio (SNR).

The mounting assembly for these transducers, however, can introduce unwanted acoustic paths that do not transit acoustic energy directly through the fluid but instead may pass the acoustic energy through paths that include the transducer housing and/or the pipeline. The acoustic energy that takes these paths, referred to as "multi-path noise" or "solid body noise transmission", can produce errors in the flow measurement or even interfere with the measurement.

Accordingly, improved device designs that may isolate the acoustic transducers from producing "multi-path noise," and thus increase the SNR for transducers in an ultrasonic flowmeter are desirable.

BRIEF SUMMARY

The present disclosure relates to devices and methods for producing acoustic signals with the least amount of "multi-path noise" by acoustically isolating the transducers, such as through designed "isolators". The isolators minimize contact between the transducer and a meter body in which the transducer is installed, and thus reduce multi-path noise transmission along paths outside a fluid flow through which the ultrasonic transducer is transmitting.

In an exemplary ultrasonic transducer, one or more isolation washers are sandwiched between a load bearing nut and a proximal end of a housing having a distal acoustically transparent window. The acoustically transparent window has an exterior surface configured to be exposed to process pressure when the transducer is mounted in a recess of an ultrasonic flowmeter body and an interior surface in contact with an electroacoustic element configured to transmit acoustic energy. The isolation washers reduce contact between the housing comprising the acoustic window and electroacoustic element and the mounting elements used to secure the housing in a meter body. Accordingly, the present disclosure provides novel components of a mounting for an ultrasonic transducer including isolation washers and load bearing nuts, each of which may comprise grooves, ridges, and/or protrusions ("isolating elements") that minimize contact with the flowmeter body.

The present disclosure further provides an ultrasonic flowmeter comprising at least one pair of transducer assemblies as described above. As example, the ultrasonic flow meter may comprise transducer pairs positioned in operative relation to a fluid medium to transduce acoustic wave energy through the fluid medium between transducers of the pair, wherein each transducer includes an isolation mounting for isolating the transducer from surrounding elements of the ultrasonic flow meter to reduce solid body noise transmission along paths outside the fluid medium.

The present disclosure further provides methods of assembling the transducer assemblies disclosed herein, and methods for reducing "multi-path noise," and thus increase the signal-to-noise ratio for transducers in an ultrasonic flowmeter by use of the disclosed isolation washers and/or load bearing nut.

DESCRIPTION OF THE DRAWINGS

The present invention is described in detail below with reference to the accompanying drawings. Where several embodiments are disclosed, similar components having similar functions may be denoted by an identical reference number. Moreover, the drawings are not necessarily to scale. The drawings are intended to depict only typical aspects of the subject matter disclosed herein, and therefore should not be considered as limiting the scope of the disclosure. The embodiments shown and described below include isolators, transducer assemblies comprising those isolators, ultrasonic gas and/or liquid flowmeters comprising the isolated transducers, and methods for reducing multi-path noise in an ultrasonic gas and/or liquid flowmeter. While the isolators are shown and described in use with transducers used in ultrasonic flowmeters measuring gas and/or liquid flow rates, they may find use in other types of transducers and for measurement in other mediums, e.g., for tissue or materials characterization. The drawings and description below are merely exemplary of particular possible embodiments and are not intended to limit an aspect of the present invention to the specific aspects shown and described.

FIGS. 17A-17D illustrate exemplary isolation washers of a transducer according to the present disclosure.

FIG. 19 provides a flow chart of a method of assembling components of a transducer according to aspects of the present disclosure.

DETAILED DESCRIPTION

Figure 1A:
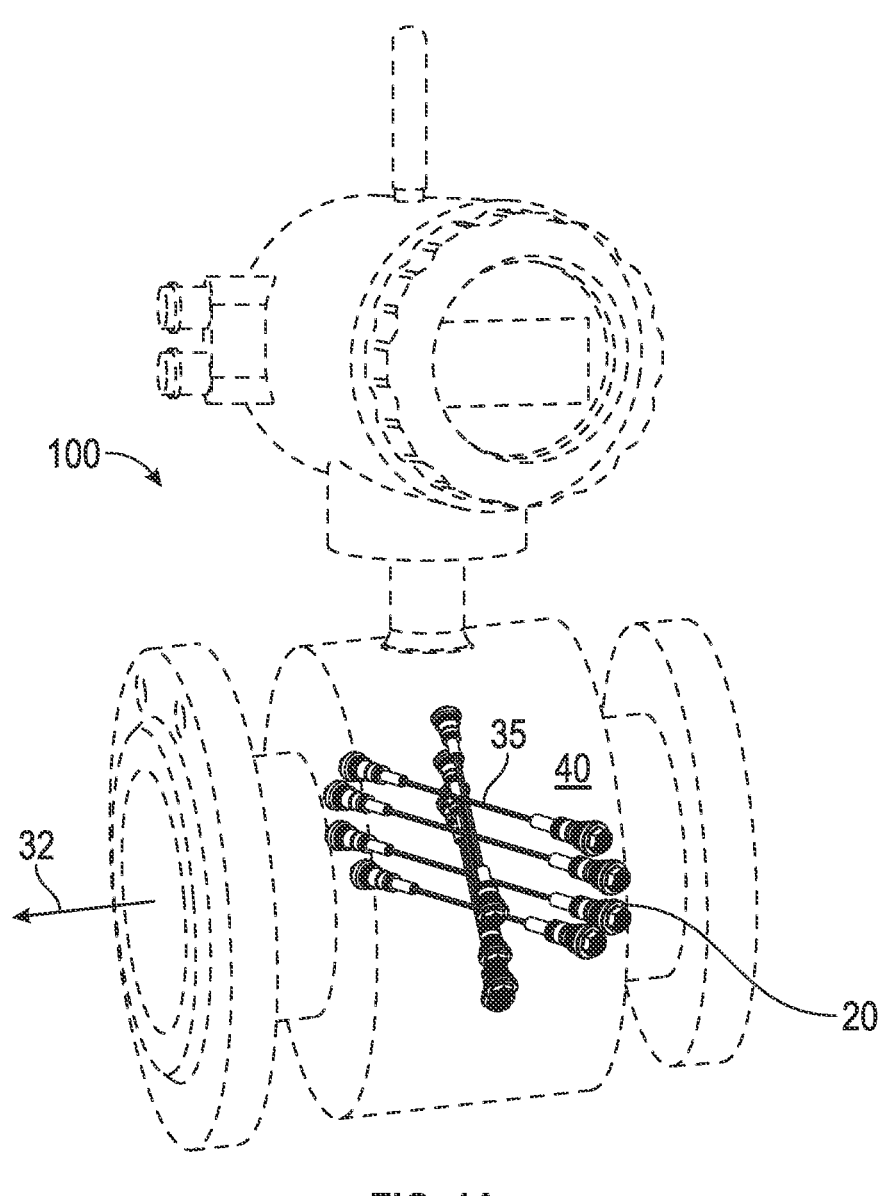
FIG. 1A illustrates transducers according to the present disclosure installed in a housing, i.e., meter body, of an ultrasonic flowmeter, wherein the meter body is shown as transparent so that the path of acoustic propagation along the axis of each transducer pair is apparent.

In the following description, the present invention is set forth in the context of various alternative embodiments and implementations involving isolators that minimize the contact area between a transducer and a fluid conduit or meter body of an ultrasonic flowmeter in which the transducer is installed. The isolators allow the transducer to acoustically "float" in its location with few non-fluid acoustic paths, thus minimizing potential "multi-path noise" routes.

In typical ultrasonic flowmeter applications, the acoustic energy used to measure flow can also produce "multi-path" noise within the meter body itself. This noise or acoustic energy takes an undesired path from the transmitting transducer to the receiving transducer, typically through the mechanical mounting of the transducer to the meter body. The mechanical mount may be a retaining nut having a central bore that allows the transducer components, i.e., the transducer module comprising the electroacoustic element and wires for connection to electronics of the flowmeter, to be removed through the central bore while maintaining pressure in the conduit and meter body. Other means to hold the pressure loads, including retaining rings, snap rings, and the like are also possible and within the scope of this disclosure as the general principles described herein are applicable to these other types of mechanical mounts.

Acoustic flowmeter design strives to maximize the energy put into the fluid by a transmitting transducer and across the fluid to a receiving transducer. Existing technologies can struggle with degraded signal to noise ratios (SNR) due to acoustic energy passing into the meter body and then into the receiving transducer. This is particularly true when the fluid pressure within the conduit is low, e.g., the gas pressure is low, as the signal strength is proportional to the pressure in the conduit. Prior art designs to minimize the energy that gets coupled into the meter body through the mechanical mount have used plastic sandwiches or other non-metal materials to reduce multi-path noise by virtue of significant differences in the acoustic impedance of a plastic ($\sim$3 MRayls; kg/(m$^2$ s)=1 Rayl) to a metal ($\sim$45 MRayls).

The present disclosure provides novel mounting elements that minimization the energy transmitted through the metal of the conduit or meter body by introducing non-contiguous acoustic paths, i.e., acoustic paths having gaps or openings. The acoustic impedance of air is 0.0004 MRayls. Thus, introduction of air gaps within the mechanical mount greatly reduces the paths the acoustic energy may take to travel backwards through the mechanical mount and meter body, and thus greatly reduces the multi-path noise common in prior art ultrasonic flowmeters.

Mechanical mounts are exposed to large stresses due to the pressures within the conduit or meter body. Thus, the present inventor has designed novel mounting elements with grooves, ridges, and/or protrusions, such as merlons or castellations, that allow the transducer to acoustically "float" in its location with few non-gas acoustic paths while still providing sufficient mechanical strength within the mount to bear the stresses due to fluid pressure in the conduit and meter body. Moreover, the present inventor has configured the spacing of the grooves, ridges, and/or protrusions to provide wave cancellation, thus further reducing the multi-path noise. The spacing minimizes the contact area between the transducer and the meter body, i.e., areas that "multi-path" noise may be propagating, while supporting pressure loads where the desired acoustic energy is directed, i.e., into the fluid. Thus, the novel designs presented herein provide transducer mounting dimensional control, i.e., no flexing under high stresses/pressures, and disperse the acoustic energy over an area/volume that does not have a path to the overall meter body.

As used herein, the term "isolating element" will generally refer to any of the grooves, ridges, and/or protrusions that may reduce contact between the transducer and the components used to mount the transducer within the meter body, thus reducing contact between the transducer and the meter body. Moreover, the term "fluid" shall be understood to include both liquids (e.g., water, crude oil or gasoline) and gases (e.g., methane).

Figure 1B:
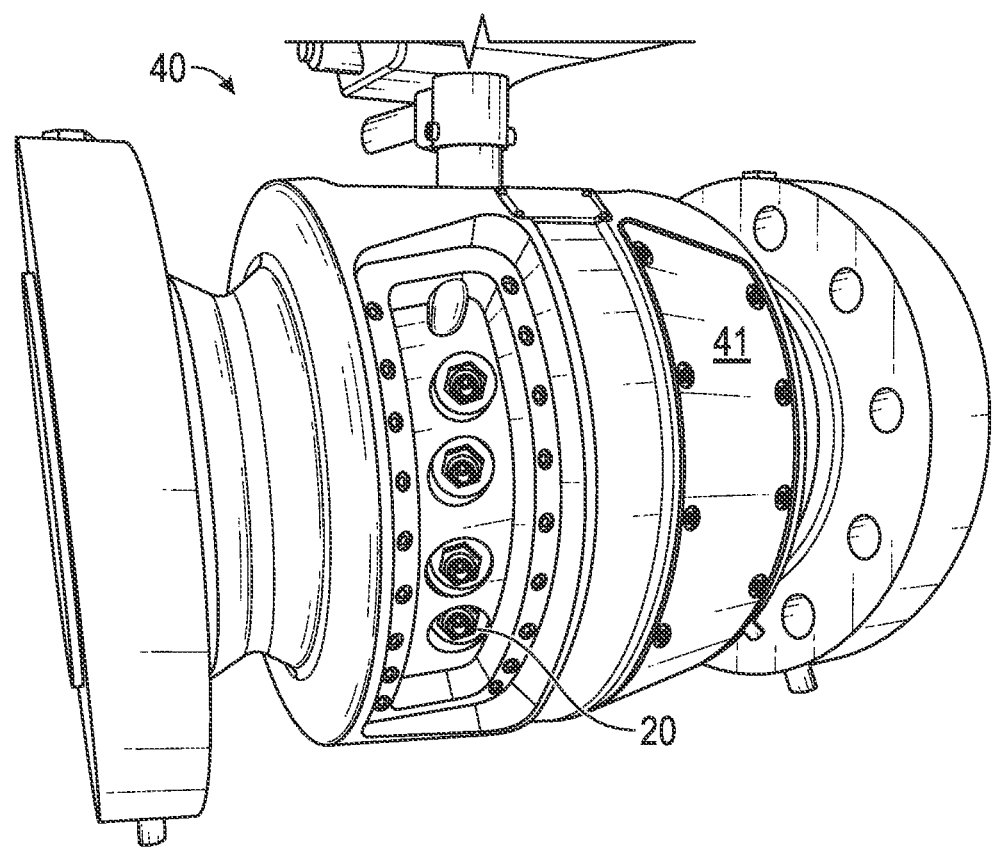
FIG. 1B illustrates an exterior of the ultrasonic flowmeter shown in FIG. 1A, wherein four transducer assemblies are visible within respective recesses on a body of the flowmeter.

With reference to the drawings, FIGS. 1A and 1B show an exemplary transit time ultrasonic flow meter 100 having a plurality of transducer assemblies 20 installed in a housing or body 40 of the flowmeter. The direction of acoustic propagation is angled along the longitudinal axis of the conduit between pairs of transducer assemblies (lines 35) positioned across a channel 32 of the meter body 40.

Figure 2:
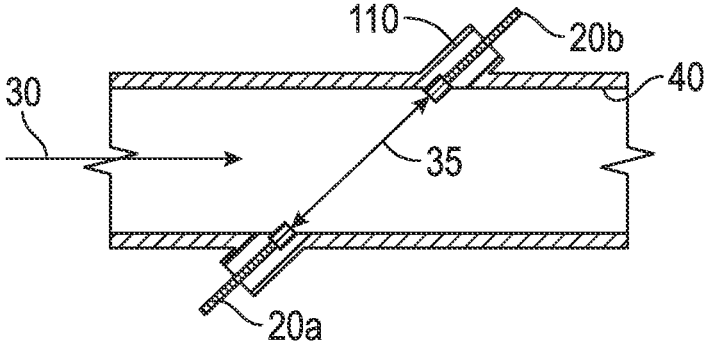
FIG. 2 illustrates a simplified representation of one transducer pair and the path of acoustic propagation therebetween.

As shown in FIG. 2, a standard flowmeter design provides transducer assemblies in pairs (20a, 20b) positioned in recesses 110 in the meter body 40, wherein each transducer assembly in the pair will transmit and receive acoustic energy along a path 35 therebetween. The difference in travel times for ultrasonic energy pulses transmitted with the fluid flow 30 in the channel 32 of the meter body and those transmitted against the fluid flow are used to determine the velocity of the fluid flow 30 in the conduit.

With reference back to FIGS. 1A and 1B, the flowmeter 100 may comprise more than one transducer assembly pair, such as four, six, eight as shown in FIG. 1A, or more. That is, the flowmeter 100 may include a plurality of recesses in the meter body 40 configured to accept transducer assembly pairs to measure flow rates, i.e., send and receive times of ultrasonic signals, at different points in the channel 32. Measurements at different points throughout the meter body provides improved velocity measurement accuracy as the measurements may account for laminar flow, transitional flow, turbulent flow, and other flow disturbances in the channel 32.

As shown in FIG. 1B, the transducer assemblies 20 are accessible from an exterior of the meter body. Depicted are four transducers on a first side of the meter body 40, wherein a paired set of four transducers are installed on an opposite side of the meter body. The meter includes an additional set of four of transducer under cover 41, which are paired with four transducers installed on the opposite side of the meter. As shown in FIG. 1A, the signal paths 35 are not directly across a diameter of the meter body but are angled with respect to the longitudinal axis of the meter body (i.e., the direction of flow in the process piping).

Figure 3:
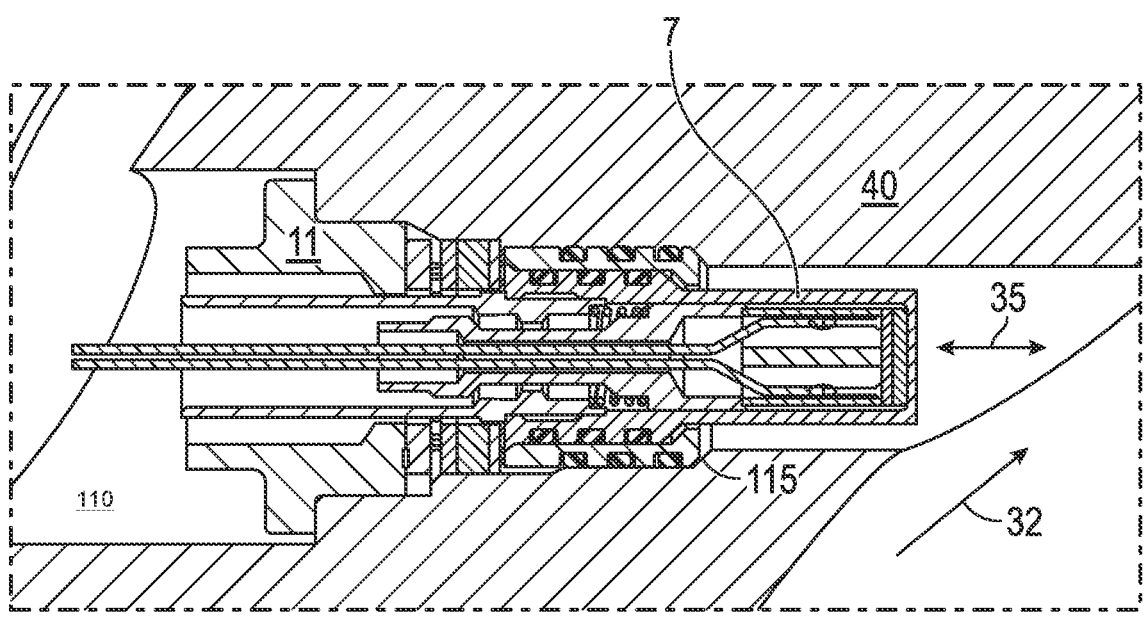
FIG. 3 illustrates a cross-sectional view of a transducer positioned in a housing according to aspects of the present disclosure.

Shown in FIG. 3 is a cross section of an exemplary transducer assembly 20 installed in a recess in the body 40 of an ultrasonic flowmeter. An exemplary flowmeter 100 generally comprises a meter body 40 attachable to a conduit and alignable with the fluid flow in the conduit, wherein transducer pairs are positioned in opposing recesses 110 in the meter body 40 and configured to send/receive ultrasonic signals 35 across the fluid path or channel 32. Each recess 110 may include a housing 7 that maintains pressure in the channel 32. The housing 7 forms a gas tight seal with the channel 32 via a seal such as O-rings seated within circumferential channels along an outer perimeter of the housing 7. As such, the housing 7 acts as a pressure boundary to contain the fluid in the channel 32.

Figure 4:
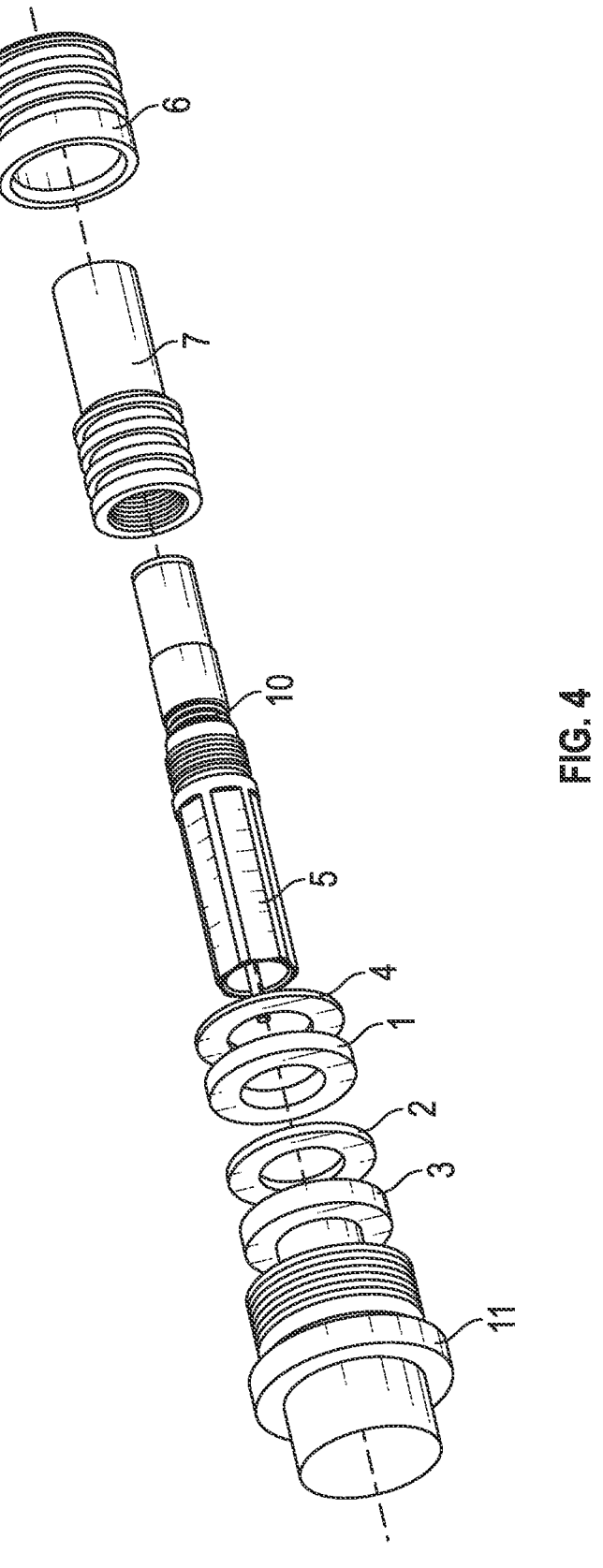
FIG. 4 illustrates an expanded view of the transducer shown in FIG. 3.

Components of an exemplary transducer assembly 20 of the present disclosure are shown in FIG. 4. Some implementations of the assembly may include a bushing 6 that fits over an outer perimeter of the housing 7 and its associated O-rings 8, wherein the bushing 6 forms a gas tight seal with the channel 32 via a seal such as O-rings 9 seated within circumferential channels 9a along an outer perimeter of the bushing 6. In this design, the housing 7 forms a gas tight seal with an inner surface of the bushing 6, such as via the O-rings 8. Each of the housing 7 and bushing 6 may be held in place in the recess 110 via a mechanical mount and stopped from inward movement by a ledge 115 in the recess 100 of the meter body 40.

The mechanical mount of the present disclosure, referred to herein as an isolation mounting, includes one or more novel isolation washers (3, 4) and/or a novel retaining nut, referred to herein as a load bearing nut 11. Each of the isolation washers (3, 4) include a top surface (e.g., 3b) and a bottom surface (e.g., 3a). The top surface of an isolation washer comprises one or more isolating elements. As shown in FIGS. 17A-17D, the isolating elements may be formed annularly. For example, an isolation washer may include a single annular protrusion or ridge 15b, as shown in FIG. 17B, or two annular protrusions or ridges 15c, as shown in FIG. 17C, or even more annular protrusions, i.e., three or more ridges spaced apart for each other. The annular protrusions may include spaced gaps or crenels, thus forming a series of upstanding merlons (15a, 15d), such as shown in FIGS. 17A and 17D. The merlons may be evenly spaced as shown, i.e., all crenels are of the same size, or may have varied spacing.

Additionally, or alternatively, the isolating elements may be positioned radially on the isolation washer. For example, an isolation washer may include two or more protrusions or ridges extending radially outward from the central bore of the washer, such as three or more evenly spaced ridges. The ridges may extend along the surface of the isolation washer from the inner bore to an outer circumferential perimeter, or along a portion thereof. Moreover, the radial protrusions may include spaced gaps or crenels, thus forming a series of upstanding merlons. The merlons may be evenly spaced, i.e., all crenels are of the same size, or may have varied spacing.

Additionally, or alternatively, the isolating elements may comprise protrusions or merlons positioned in any pattern and of any size (e.g., width) and/or shape. In general, such isolating elements would be of similar height so they are all configured for contact with another washer, either isolation washer or standard washer, the retaining nut (e.g., 11), or the proximal end of the housing (7, 7') and/or bushing (6).

Figure 18A:
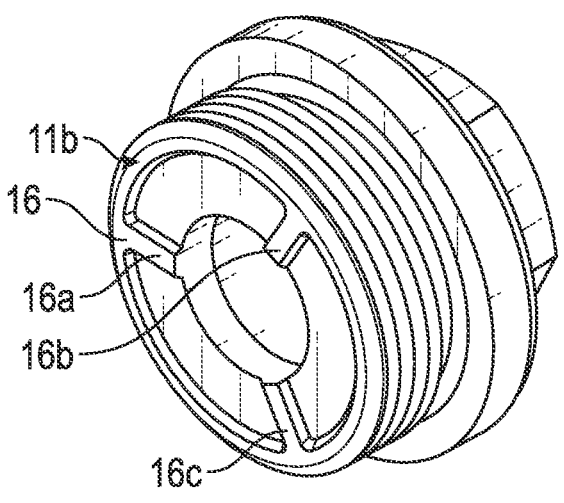
FIGS. 18A-18B illustrates front and back perspective views of a load bearing component/nut of a transducer according to the present disclosure.

The load bearing nut 11 includes a central axial bore (see FIG. 18C) and a top surface 11b comprising one or more isolating elements. The isolating elements may be as described above with reference to the isolation washer(s). That is, the isolating elements may be and one or more of annular ridges, annular ridges having evenly spaced crenels, radially extending ridges, radially extending ridges having evenly spaced crenels, protrusion evenly spaced apart radially, and protrusion evenly spaced apart annularly. As shown in FIG. 18A, an exemplary arrangement of isolating elements on load bearing nut 11 may include an annular raised protrusion 16. The annular raised ridge 16 may include two or more radially extending portions (16a-16c), such as extending inward toward the central bore to provide additional load support.

A bottom surface 11a of the nut 11 may include a raised lip 17 having a hexagonally shaped outer perimeter that allows connection with the transducer module via an installation tool (FIG. 18B), such as for installation within a recess 110 in a meter body or conduit. The load bearing nut 11 further includes an outer threaded circumference 19 that may engage a complementary threaded region in a recess 110 of the meter body 40. Thus, as shown in FIG. 3, the load bearing nut may secure the housing 7 and bushing 6, when included, within a recess 110 in the meter body 40. As shown, the isolating elements on the top surface of the load bearing nut 11 may face inward toward the housing 7 of a transducer assembly.

The isolation washers disclosed herein may be included in the isolation mounting individually, in combination with additional isolation washers of similar or different configurations (3, 4), e.g., different washer thickness or arrangement of isolating elements, and/or with standard washers (1, 2) or a standard retaining nut when the load bearing nut 11 is not included. For example, and with specific reference to FIGS. 5, 7, and 8, an exemplary arrangement of isolation washer(s) (3, 4) is shown. A first isolation washer 4 may be positioned against a distal end of the housing 7 with the top surface having the isolating elements facing toward the housing 7.

Of note, the distal end (7*b* of FIG. 6) of the housing 7 is open while an opposite proximal end 7*a* is closed and faces inward toward the fluid flow 30 in the channel 32. When the isolation washer 4 is positioned in this way, the protrusions contact a distal end of the housing 7 and/or bushing 6. An additional isolation washer 3 is shown with a top surface having the isolating elements facing toward the bottom surface of the first isolation washer 4 and the distal end of the housing 7.

Figure 5:
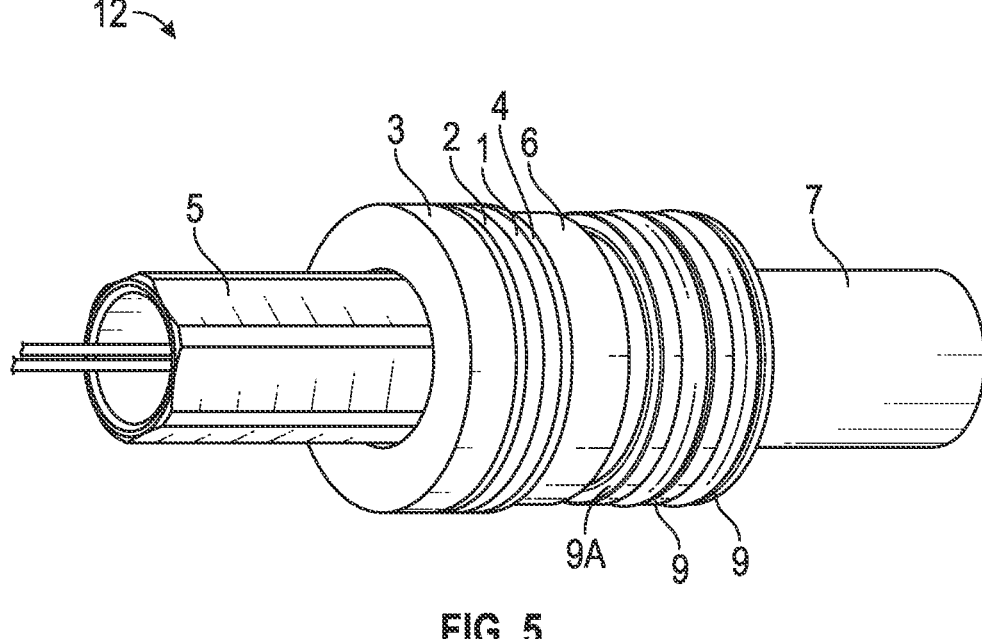
FIG. 5 illustrates a view of a transducer module including isolation washers according to aspects of the present disclosure.

Standard washers may be included in the isolation mounting, such as sandwiched between two isolation washers, or sandwiched between an isolation washer and the load bearing nut 11, or sandwiched between an isolation washer and the housing 7, or on either side of one or more isolation washers (i.e., the standard washers may surround or be interposed with the isolation washers). As example, shown in FIGS. 5 and 7 are two standard washers (1, 2) sandwiched between isolation washers 3 and 4.

Figure 7:
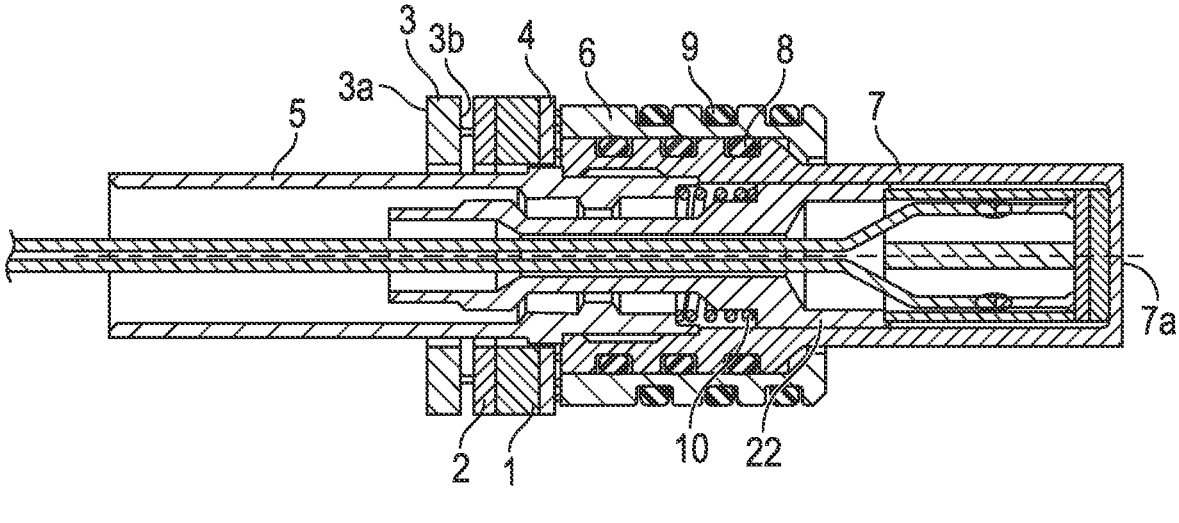
FIG. 7 illustrates a cross-sectional view of the transducer module shown in FIG. 5.
Figure 8:
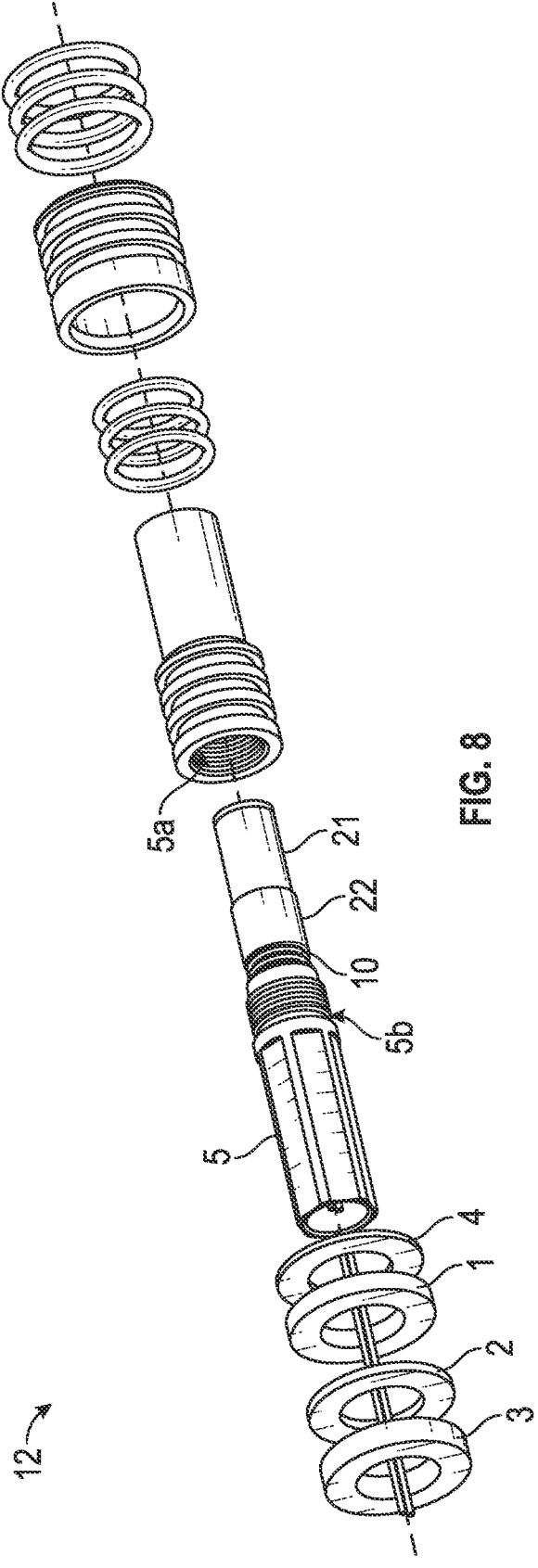
FIG. 8 illustrates an expanded view of the transducer module shown in FIG. 7.

As shown in FIGS. 7 and 8, the washers (1-4) may have different thicknesses and even varied materials. For example, the isolation washers (3, 4) and load bearing nut (11) may be formed of a durable material, such as a metal. Exemplary metals include at least corrosion resistant metals, such as stainless steel, or any other corrosion resistant durable metal known in the art. The standard washers (1, 2) may be formed of any material known in the art, such as metals or polymeric materials. Exemplary metals include at least stainless steel. Exemplary polymeric materials include thermoplastic polymers such as at least polyetherketone (PEK), polyether ether ketone (PEEK), polyaryletherketone (PAEK), polyamides and similar high strength polymers.

Varying the metal thickness (e.g., isolation washer 3 versus 4) and/or materials of the washers in the isolation mounting, such as by inclusion of standard washers formed of a polymeric material, causes a shift in acoustic propagation properties (e.g., speed of sound, acoustic impedance, etc.) that will tend to reject acoustic energy from propagating therethrough. Thus, in addition to creating an air gap through use of the isolation washers, the isolation mount may be further configured, such as shown in FIG. 7, to reduce noise propagation and thus increase the signal-to-noise ratio.

Figure 15:
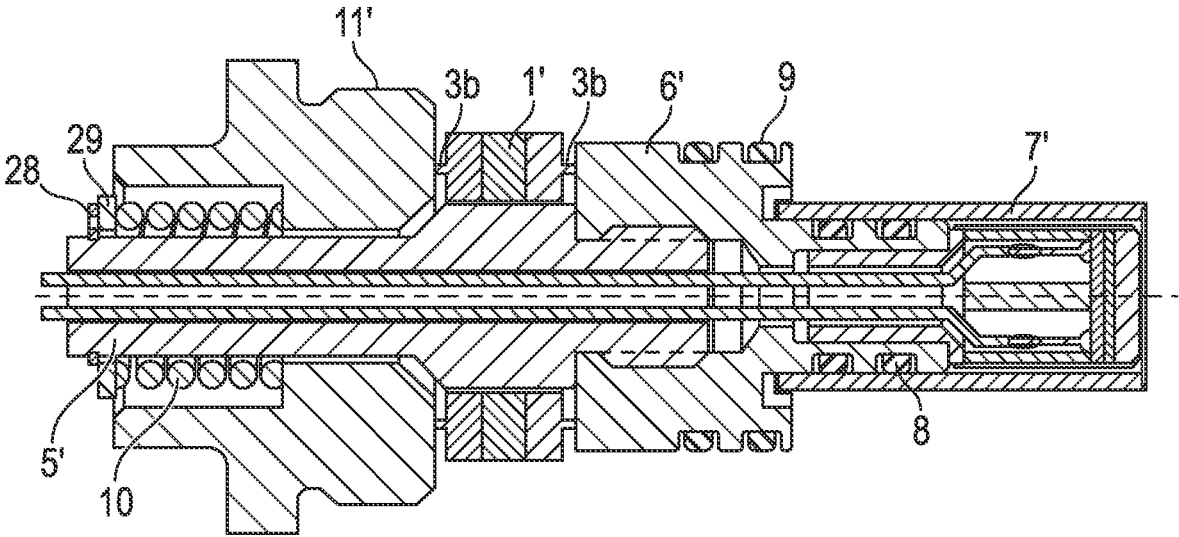
FIG. 15 illustrates a cross-sectional view of the transducer assembly shown in FIG. 14.
Figure 16:
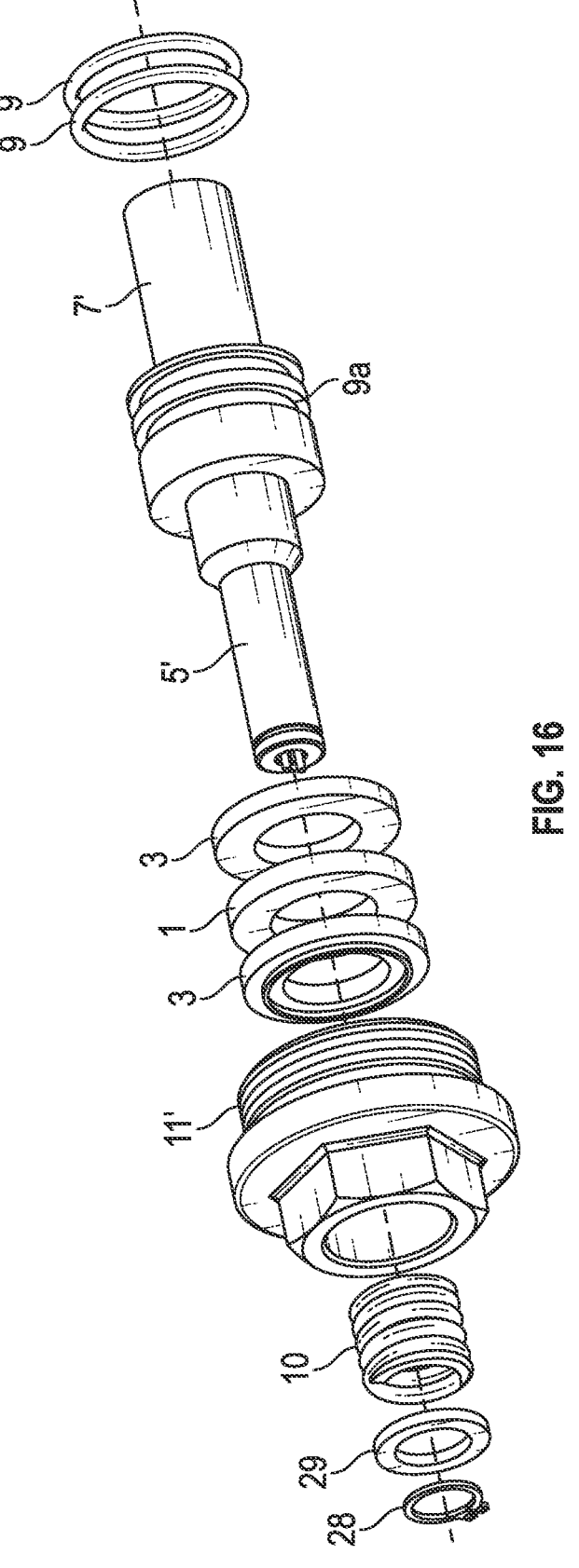
FIG. 16 illustrates an expanded view of the transducer assembly shown in FIG. 15.

While the isolation washers are shown to have specific orientations in FIGS. 7 and 15, other orientations and arrangements are possible and within the scope of the present disclosure. Further, any number of isolation and standard washers may be included according to the size of the transducer assembly, thickness and material of the washer, type of fluid in the conduit, and/or arrangement of isolating elements.

Figure 18B:
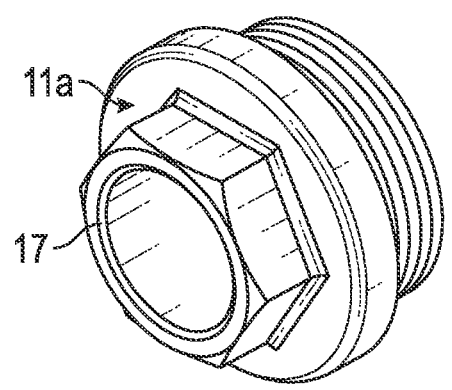
Figure 18C:
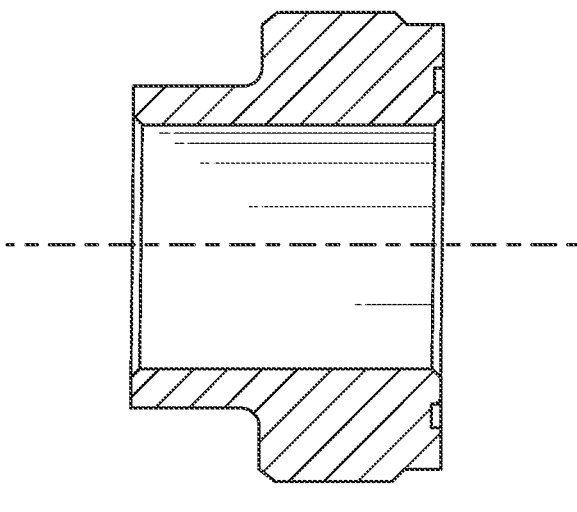
FIG. 18C illustrates a cross-sectional view of the load bearing component/nut shown in FIGS. 18A and 18B.

With reference to FIGS. 3, 18A, and 18B, the isolation mounting includes a threaded retaining nut that engages a threaded region at a proximal end of the recess 110 opposite the flow channel. According to certain aspects, the threaded retaining nut is the load bearing nut 11 described hereinabove, which may be positioned with the top surface 11*b* comprising the isolating element(s) oriented toward the isolation washers, i.e., the isolation washers and any standard washers are sandwiched between the load bearing nut 11 and the housing 7. The housing 7 and bushing 6 may be secured within the recess 110 by the isolation mounting, i.e., the isolation washers (3, 4) and threaded nut or load bearing nut 11. Further, the threaded nut or load bearing nut 11 may be disengaged from the recess 110 (e.g., unscrewed) so that the electroacoustic element 26 may be removed from the recesses 110 without having to depressurize the channel 30.

The electroacoustic element 26, such as a piezoelectric crystal or ceramic, is configured to produce ultrasonic mechanical waves in response to applied electrical power. As shown in FIG. 7, the transducer housing 7 is a hollow cylinder in which the electroacoustic element 26 is mounted. While ultrasonic piezoelectric elements such as a crystal are generally described herein, any of the transducer modules 12 and assemblies 20 disclosed herein can use other types of transducers (e.g., non-ultrasonic transducers, magnetostrictive transducers, capacitive transducers, and so forth).

Figure 9:
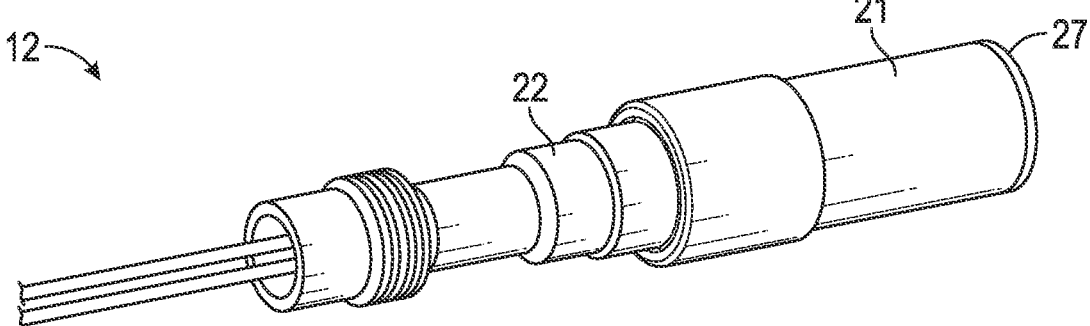
FIG. 9 illustrates an exemplary transducer plunger and crystal assembly according to aspects of the present disclosure.
Figure 10:
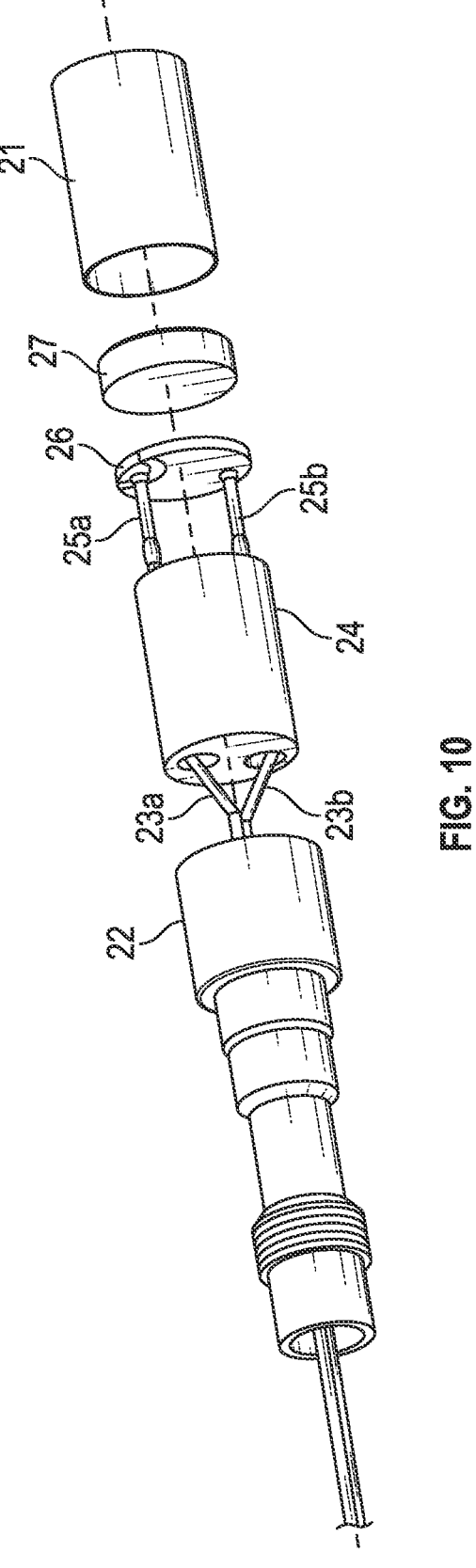
FIG. 10 illustrates an expanded view of the exemplary transducer plunger and crystal assembly shown in FIG. 9.
Figure 11:
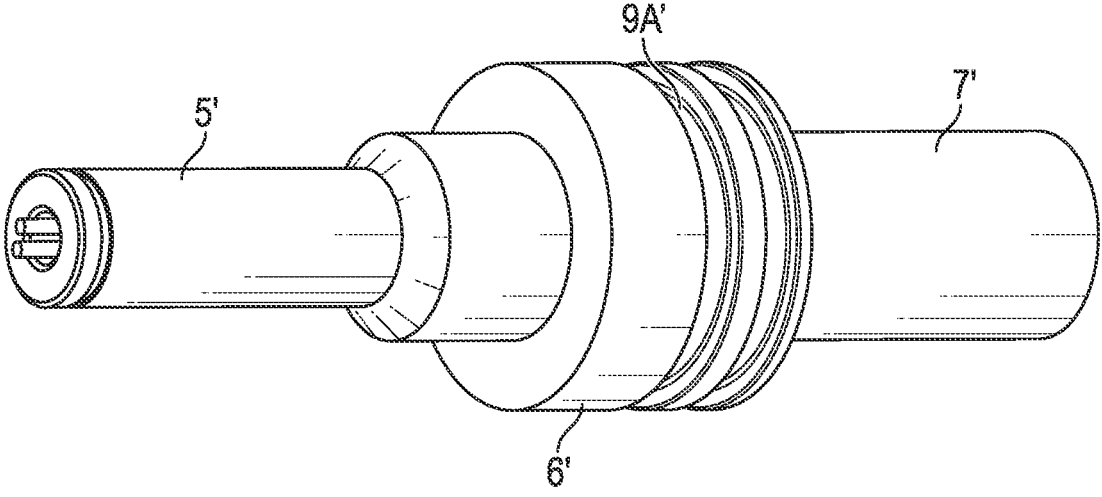
FIG. 11 illustrates a view of a transducer module including isolation washers according to additional aspects of the present disclosure.
Figure 12:
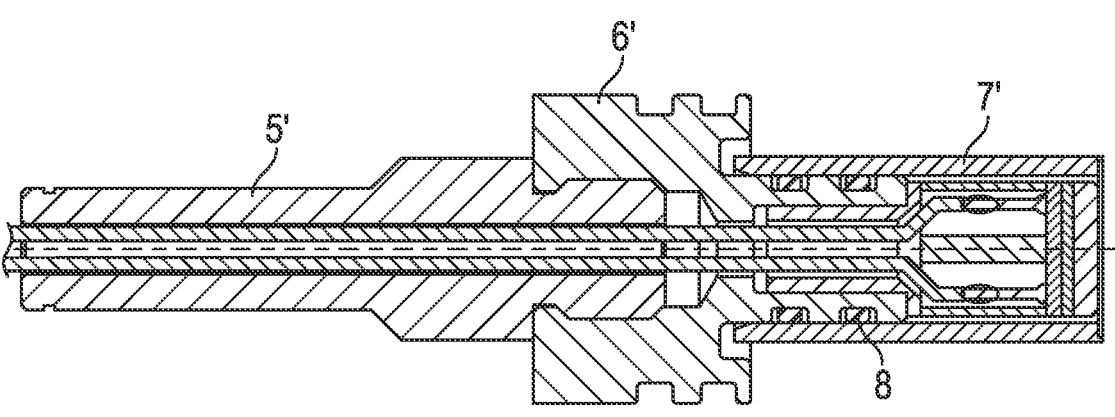
FIG. 12 illustrates a cross-sectional view of a transducer module shown in FIG. 11.
Figure 13:
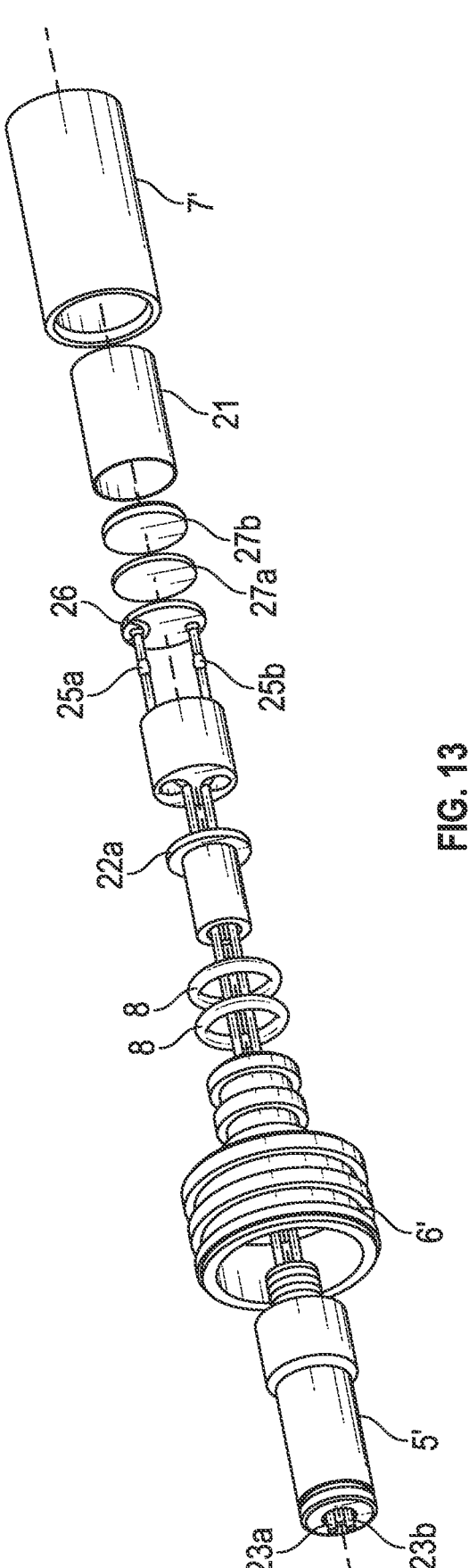
FIG. 13 illustrates an expanded view of the transducer module shown in FIG. 12.

With reference to FIGS. 9 and 10, an exemplary arrangement of the electroacoustic element within the transducer module 12 is shown. The transducer module 12 generally comprises a wear face 27, an electroacoustic element 26 such as a piezoelectric element, and a backing mass 24 that are potted in a casing 21 with a load cylinder 22. The wear face 27 is made of impedance matching material such as high purity alumina ($Al_2O_3$) or plastic. The electroacoustic element 26 is generally a piezoceramic such as a lead zirconate titanate material, i.e., PZT-5A or PZT-5H, or a composite material, such as made from PZT-5H and epoxy (Smart Material Inc., Sarasota, Fla.). The backing mass 24 may comprise a composite material such as metal filings filled with epoxy at a low volume fraction, or a syntactic foam comprising hollow spheres, typically made of glass, bound together with a thermoset polymer such as Syn-Foam®.

Connections between the electroacoustic element 26 and the electronics used to convert transducer signals to flowrates in the conduit are shown in FIG. 10. Included are a (+) wire 23*a* and a (−) wire 23*b* that are soldered to electrodes 25*a*, 25*b* that are bonded to the electroacoustic element 26 using either solder or silver epoxy.

Figure 6:
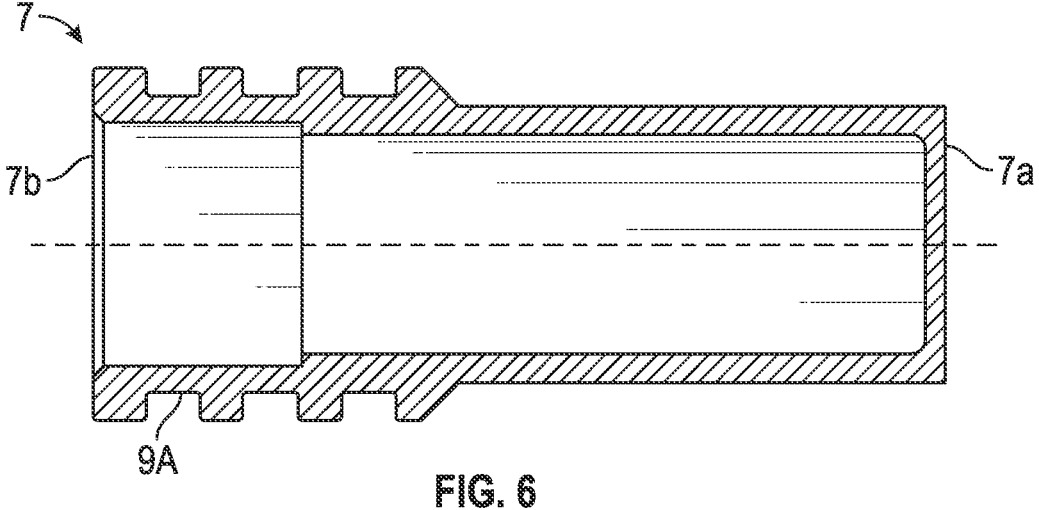
FIG. 6 illustrates an exemplary housing having a transducer window at a distal end according to aspects of the present disclosure.

With reference to FIG. 6, each housing 7 includes a window 7*a*, i.e., closed end of the housing 7, that is in acoustic communication with the channel 32. The window of the housing 7 may be thin enough to be acoustically efficient, i.e., nearly acoustically transparent, but thick enough to withstand the pressure in the meter body or conduit. For example, the window may have a thickness less than ¼ wavelength (λ/4) of ultrasound in the window's material, such as less than ¹⁄₁₀ wavelength (λ/10) of ultrasound in the window's material, or about λ/36 to λ/150. As such, the housing 7 may include a window 7*a* having a thickness of less than λ/10, or about λ/36 to λ/150, or any wavelength between λ/10 to λ/36, or λ/10 to λ/150, or λ/36 to λ/150.

The housing 7 and window 7*a* generally comprise a corrosion resistant metal, such as titanium, stainless steel, or another metal known in the art. Since titanium has lower acoustic impedance than steel, it is a preferred metal for acoustic use, such as for the window 7*a*. Alternatively, the housing and window may comprise a thermoplastic polymer, such as polyetherketone (PEK) or polyether ether ketone (PEEK). A wavelength (λ) of titanium at 200 kHz is about 30 mm when the speed of sound in the material is about 6100 m/s. As such, a λ/10 titanium window would be about 3 mm thick while a λ/36 or λ/150 titanium window would be about 0.8 mm or about 0.2 mm thick, respectively.

The titanium window (7*a*) may be machined or laser welded to the housing 7. Laser welding is a low heat process compared to torch welding therefore there is little or no damage to the mechanical integrity of the titanium window or the housing.

A proximal end of the assembled electroacoustic component shown in FIGS. 9 and 10 (electroacoustic element 26, wear face 27, backing mass 24, and casing 21) is positioned within the load cylinder 22 (proximal end is opposite the distal end having the wear face 27). As shown in FIG. 8, a distal end of the assembled electroacoustic element, i.e., end closest to the wear face 27, may be positioned within the housing 7, such as through the open proximal end 7b of the housing 7. A plunger 5 may be positioned over the proximal end of the load cylinder 22 with a spring 10 positioned therebetween. As shown in FIG. 7, the plunger engages one end of the spring on an inner circumferential surface or stop, and the assembled electroacoustic component engages the spring on an outer circumferential surface or stop. The plunger comprises an outer threaded region 5b that engages a complementary inner threaded region 5a on the housing 7. As such, the plunger may be screwed into the housing to secure the transducer therein, and to force the wear face 27 into close contact with an inner wall of the window in the housing (i.e., distal end of the housing 7). To improve acoustic coupling of the transducer 12 to the window, a grease may be included between the wear face 27 and the closed distal end of the housing 7.

Another exemplary transducer module 12' and transducer assembly 20' is shown in FIGS. 11-16. With specific reference to FIGS. 11-13, a transducer module 12' may include a housing 7' having an acoustic window, i.e., closed distal end of the housing 7', and an open proximal end. An assembled electroacoustic component comprising an electroacoustic element 26, wear face 27b, backing mass 24, and casing 21, as described hereinabove, is positionable within the housing 7' such that the electroacoustic element 26 is in contact with the window 7a. In this specific implementation, an additional washer 27a is included between the electroacoustic element 26 and the wear face 27b. Further, a top hat component 13 may be included at a proximal end of the backing mass 24 (opposite the electroacoustic element 26).

A bushing 6' is positioned within the proximal end of the housing 7' over the assembled electroacoustic component and associated electrodes (25a, 25b). The portion of the bushing 6' positioned within the housing 7' may provide a gastight seal against the inner wall of the housing via O-rings 8 positioned within circumferential grooves on an outer surface of the bushing 6'. Further, a plunger 5' may be positioned within the proximal end of the bushing 6' and secured therein via a threaded connection.

Figure 14:
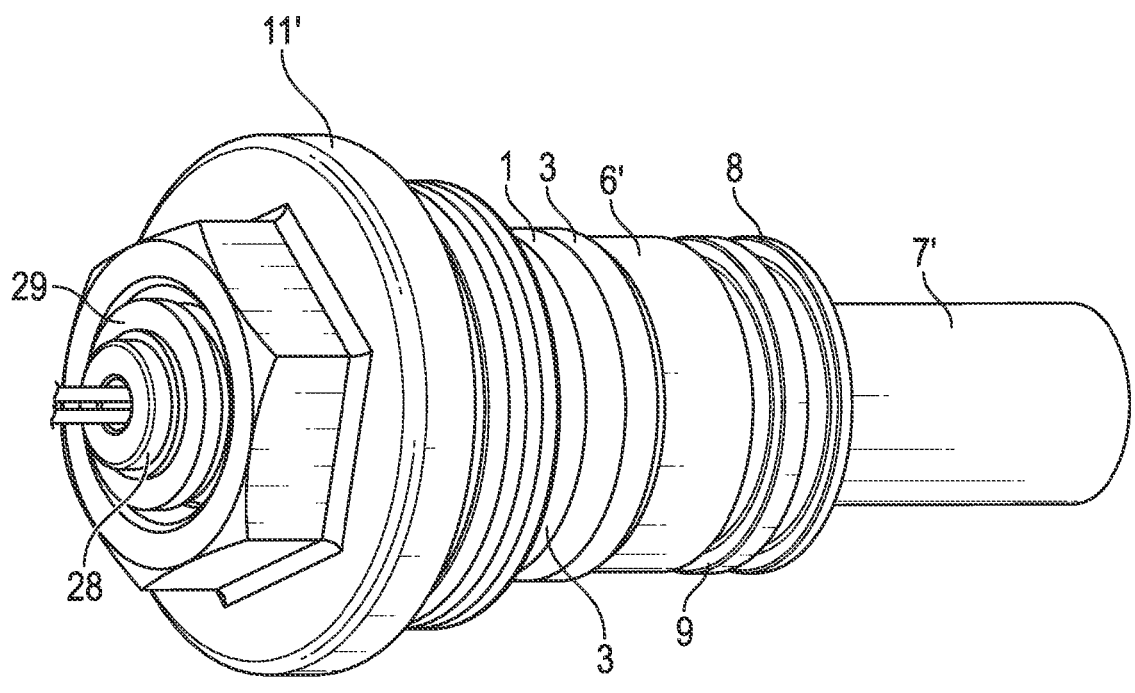
FIG. 14 illustrates a view of a transducer assembly including the transducer module shown in FIGS. 11-13 according to aspects of the present disclosure.

With specific reference to FIGS. 14 and 15, the transducer module 12' may include an isolation mounting having one or more isolation washers and/or standard washers, such as described hereinabove, and a threaded nut. In some implementations, the threaded nut is a load bearing nut 11' as described hereinabove.

One or more isolation washers (3, 4) and/or standard washers (1, 2) are positioned over the proximal end of the plunger 5', in any arrangement as described above. The threaded nut or load bearing nut 11' is configured to be positioned over a proximal end of the plunger 5' with the isolation washers (3, 4) sandwiched between a proximal end of the bushing 6' and a distal end of the threaded nut or load bearing nut 11'. A spring 10 is positionable within a cavity in a proximal end of the threaded nut or load bearing nut 11', wherein a washer 29 and retaining ring 28 may engage a groove in a distal end of the plunger 5 to secure the spring within the cavity. As such, a pressure is applied to the plunger 5, which acts to push the electroacoustic element 26 and wear face 27b into direct contact with the acoustic window 7a of the housing 7'.

Depending on the specific operating conditions of the meter in which the transducer assembly (20, 20') is used, a range of frequencies can be applied, from 100 kHz to 500 kHz. The present inventor has tested an exemplary isolation mounting, as shown in FIG. 3, in 4-inch and 8-inch flow meters and have found at least a 6-fold improvement in the signal-to-noise ratio (SNR) for 100 psi to 500 psi test runs.

Also provided by the present disclosure is an ultrasonic flowmeter connectable inline on a process piping, wherein the flowmeter includes transducer pairs comprising the novel isolation mounting discussed above, i.e., isolation washers and optionally load bearing cell. Accordingly, provided is an ultrasonic flowmeter having at least one transducer pair disposed within opposing recesses in a body of the flowmeter, wherein each transducer of the pair comprises an electroacoustic element 26 disposed within a housing (7, 7') having an acoustic window 7a. The ultrasonic flowmeter further comprises a control unit configured for wireless communication. The electroacoustic element 26 is arranged inside the housing (7, 7') on the acoustic window 7a in such a way that an ultrasonic signal generated by the electroacoustic element in operation leaves the housing through the acoustic window and is transmitted through a fluid flowing in the process piping to the acoustic window of a paired transducer, where the signal is received and interpreted by the electroacoustic element of the paired transducer and control unit.

The housing and window serve to maintain the mechanical integrity of the transducer by being a pressure barrier from the fluid in the process piping. Typical operation pressure ratings range from 14.7 psig to 6,000 psig. Typical operating temperatures range from −40 C to 100 C. As described hereinabove, the disclosed transducers are removeable from the ultrasonic flowmeter without having to depressurize the process piping.

Also provided by the present disclosure is a method for reducing "multi-path noise," and thus increasing the signal-to-noise ratio for transducers in an ultrasonic flowmeter using the novel isolation mounting. According to aspects, the isolation mounting comprises at least one isolation washer and/or a load bearing nut having an axial bore, wherein either or both comprise isolating elements that interrupt propagation of acoustic energy through the isolation mounting. These elements may be included on a transducer individually or in combination and are generally positioned adjacent a housing of the transducer at an opposite end from the acoustic window of the housing. Moreover, more than one isolation washer may be included, and in some implementations, standard washers may surround or be interposed with the isolation washers.

Also provided are methods for assembling a transducer comprising an isolation mounting. With reference to FIG. 19, the method may comprise soldering wires (+ and − electrodes) to a first side of an electroacoustic element, wherein the wires are then fed through respective longitudinal bores in a backing mass so that the first side of the electroacoustic element abuts the backing mass. The backing mass is then bonded to the first side of the electroacoustic element.

A washer (optional) and wear face may then be bonded to an opposite side of the electroacoustic element, and the top open portion of the longitudinal bores in the backing mass may be filled, such as with a noise attenuating material. The combined wear face and optional washer, piezoelectric element, and backing mass may then be wrapped, such as with a noise attenuating material (e.g., polyimide acrylic tape with an adhesive).

The electrodes may then be fed through openings in additional components of the transducer assembly (e.g., load cylinder 22 or 22a, plunger 5 or 5', bushing 6 or 6'), and O-rings may be installed within outer circumferential grooves of the housing and bushing. Finally, the wrapped piezoelectric element and additional components may be pushed into the housing through the top opening of the housing to form the transducer module (FIGS. 5 and 11) with the wear face juxtaposed the acoustic window.

The optional standard and isolation washers may be positioned over a proximal end of the transducer module (opposite the acoustic window), and secured thereon by a retaining nut, such as a load bearing nut having isolating elements. This assembly may then be screwed into a recess in a meter body, such as shown in FIGS. 1A and 1B.

ASPECTS OF THE DISCLOSURE

The following aspects are disclosed in this application:

Aspect 1: An isolation mounting for an ultrasonic transducer, the isolation mounting designed to reduce solid body noise transmission along paths outside a fluid flow through which the ultrasonic transducer is transmitting.

Aspect 2: The isolation mounting according to aspect 1, comprising at least one isolation washer and a load bearing nut having an axial bore, wherein either or both comprise isolating elements that interrupt propagation of acoustic energy through the isolation mounting.

Aspect 3: The isolation mounting according to aspect 2, wherein the isolating elements include wherein elements comprise one or more of: annular ridges, annular ridges having evenly spaced crenels, radially extending ridges, radially extending ridges having evenly spaced crenels, protrusion evenly spaced apart radially, and protrusion evenly spaced apart annularly.

Aspect 4: The isolation mounting according to any previous aspect, wherein the at least one isolation washer is composed of metal.

Aspect 5: The isolation mounting according to any previous aspect, wherein the load bearing nut is composed of metal.

Aspect 6: The isolation mounting according to any previous aspect, wherein the at least one isolation washer and the load bearing nut are each composed of stainless steel.

Aspect 7: A transducer comprising the isolation mounting according to any one of aspects 1 to 6.

Aspect 8: A transducer comprising a housing having an acoustically transparent window at a distal end thereof, the acoustically transparent window having an exterior surface configured to be exposed to process pressure when the transducer is mounted in a recess of an ultrasonic meter body; an electroacoustic element positionable within the housing; a plunger configured to apply a force on the electroacoustic element to urge the electroacoustic element to a position adjacent an interior surface of the acoustically transparent window; a retaining nut disposed over a proximal end of the plunger, the retaining nut including an exterior threaded region configured to engage a threaded region of the recess; and at least one isolation washer disposed over a proximal end of the plunger between the housing and the retaining nut, wherein the at least one isolation washer comprises isolating elements on a top surface that interrupt propagation of acoustic energy along paths outside a fluid flow through which the ultrasonic transducer is transmitting, wherein the isolating elements comprise one or more of: annular ridges, annular ridges having evenly spaced crenels, radially extending ridges, radially extending ridges having evenly spaced crenels, protrusion evenly spaced apart radially, and protrusion evenly spaced apart annularly.

Aspect 9: The transducer of aspect 8, wherein the at least one isolation washer is composed of a metal.

Aspect 10: The transducer according to aspects 8 or 9, wherein the retaining nut comprises isolating elements on a top surface that interrupt propagation of acoustic energy along paths outside the fluid flow through which the ultrasonic transducer is transmitting, wherein the top surface of the retaining nut is configured to face toward an acoustic window of the ultrasonic transducer, and wherein the at least one isolation washer is positioned between the retaining nut and the acoustic window.

Aspect 11: The transducer according to any one of aspects 8 to 10, wherein the at least one retaining nut is composed of a metal.

Aspect 12: The transducer according to any one of aspects 8 to 11, wherein the housing comprises titanium.

Aspect 13: The transducer according to any one of aspects 8 to 12, wherein the plunger includes a spring positioned on a distal end thereof, wherein attachment of the retaining nut over the proximal end of the plunger compresses the spring to provide the force on the electroacoustic element to urge the electroacoustic element to the position adjacent to the acoustically transparent window.

Aspect 14: The transducer according to any one of aspects 8 to 13, further comprising: one or more standard washers composed of metal or polymeric material and absent the isolating elements, wherein the one or more standard washers are disposed over the proximal end of the plunger adjacent the one or more isolation washers, and wherein the one or more standard washers and the one or more isolation washers are arranged in any order.

Aspect 15: The transducer according to any one of aspects 8 to 14, further comprising: a bushing positioned around an exterior circumference of the housing at a position adjacent the proximal end of the housing, wherein the bushing forms a gas tight seal with an inner surface of the recess of the ultrasonic meter body and the exterior circumference of the housing.

Aspect 16: The transducer according to any one of aspects 8 to 13, wherein the retaining nut comprises: a central longitudinal bore and a cavity defined by a region of the longitudinal bore at a bottom of the retaining nut having a larger inner diameter than the longitudinal bore, wherein the cavity is sized and shaped to receive a spring, wherein attachment of a retaining ring on the proximal end of the plunger over the spring compresses the spring to provide the force on the electroacoustic element to urge the electroacoustic element to the position adjacent to the acoustically transparent window.

Aspect 17: The transducer according to any one of aspects 8 to 14, further comprising: a bushing having a distal end positionable within an inner circumference of the housing at the proximal end thereof, and a proximal end positionable around an outer circumference of the plunger at the distal end thereof, the bushing forming a gas tight seal with an inner surface of the recess and the inner circumference of the housing.

Aspect 18: The transducer according to any one of aspects 8 to 17, comprising two isolation washers each having a different thickness, arrangement of isolating elements, or a combination thereof.

Aspect 19: An ultrasonic flow meter comprising transducer pairs positioned in operative relation to a fluid medium to transmit and receive acoustic wave energy through the fluid medium between transducers of the pair, wherein each transducer of a transducer pair comprises a transducer according to any one of aspects 7 to 18.

Aspect 20: An ultrasonic transducer comprising an isolation mounting according to any one of aspects 1 to 6 for reducing solid body noise transmission along paths outside a fluid flow through which the ultrasonic transducer is transmitting.

Aspect 21: An ultrasonic transducer assembly having a proximal end and an opposing distal end, the proximal end oriented towards a medium to be a measured, the transducer assembly comprising: a housing having one closed end defining the proximal end of the transducer assembly and an opposite open end; an electroacoustic signal generating element secured within the housing through the open end thereof; and an isolation mounting according to any one of aspects 1 to 6 coupled to the open end of the housing and configured to secure the housing within a recess in an ultrasonic flow meter.

Aspect 22: An ultrasonic flow meter comprising transducers according to any one of aspects 7 to 18, wherein the transducers are provided in pairs positioned in operative relation to a fluid medium to transduce acoustic wave energy through the fluid medium between transducers of the pair.

Aspect 23: An ultrasonic flowmeter for detecting gas flow rates in a pipe comprising: a container configured to be attached to the pipe having a channel through which the gas flows, the container comprising a plurality of recesses that extend through the container, wherein each recess comprises an ultrasonic transducer assembly according to any one of aspects 7 to 18.

Aspect 24: An ultrasonic flowmeter for detecting fluid flow rates in a pipe comprising: a container configured to be attached to the pipe having a channel through which the gas flows, the container comprising a plurality of recesses that extend through the container, wherein each recess comprises a housing having a pressure containing window that acts as a pressure barrier and hermetic seal to gas in the pipe; a plurality of transducers according to any one of aspects 7 to 18, with one transducer of the plurality of transducers disposed in each housing in each recess, the transducers transmitting ultrasonic signals through the windows into and receiving ultrasonic signals through the windows from the channel.

Aspect 25: The flowmeter according to any one of aspects 19 to 24, further comprising: a controller in electrical communication with the plurality of transducers which determines the gas flow rate through the channel by measuring transit times of signals transmitted by and received by the transducers.

Definitions and Abbreviations

Various aspects of the systems, devices, and methods disclosed herein may be illustrated with reference to one or more exemplary implementations. As used herein, the term "exemplary" means "serving as an example, instance, or illustration," and should not necessarily be construed as preferred or advantageous over other variations of the systems, devices, and methods disclosed herein. "Optional" or "optionally" means that the subsequently described component, event, or circumstance may or may not be included or occur, and the description encompasses instances where the component or event is included and instances where it is not.

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Certain terminology is used in the following description for convenience only and is not limiting. The words "lower," "upper," "bottom," "top," "front," "back," "left," "right" and "sides" designate directions in the drawings to which reference is made but are not limiting with respect to the orientation in which the various parts of the systems and devices disclosed herein may be used unless otherwise indicated.

It must also be noted that as used herein and in the appended claims, the singular forms "a", "an", and "the" include the plural reference unless the context clearly dictates otherwise. "an," and "the" include the plural reference unless the context clearly dictates otherwise. For example, although reference is made to "a" transducer, "an" isolation element, or "the" O-ring, one or more of any these elements and/or other elements described herein can be used.

Unless defined otherwise, all technical and scientific terms used herein have the same meanings as commonly understood by one of ordinary skill in the art.

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the terms "include", "includes", and "including" are meant to be non-limiting. As generally used herein, the terms "have", "has", and "having" are meant to be non-limiting.

Various aspects of the systems, devices, and methods disclosed herein may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications may be made without departing from the spirit and scope of the invention. Those skilled in the art will recognize or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

A list of the various elements shown in the drawings is provided in the table below.

| Reference number | Element |
| --- | --- |
| 1 | Standard washer |
| 2 | Standard washer |
| 3 | Isolation washer |
| 3a, 3b | Top and bottom surfaces of isolation washer 3, respectively |
| 4 | Isolation washer |
| 5, 5' | Plunger module |
| 5b | Threaded region on plunger module 5 |
| 5a | Threaded region on housing 7 complementary to 5 |
| 6, 6' | Bushing |
| 7, 7' | Housing with acoustic window at distal end 7a |
| 7a | Distal end of the housing 7 or 7' |
| 7b | Proximal end of the housing 7 or 7' |
| 8 | O-rings for housing 7 or 7' |
| 9 | O-rings for bushing 6 or 6' |
| 10 | Compression spring of plunger module 5 or 5' |
| 11, 11' | Load bearing nut |
| 11a, 11b | Top and bottom surface of nut 11, respectively |
| 12, 12' | Transducer module |
| 13 | Top hat component of the transducer module 12' |
| 15a-d | Isolating elements on isolation washers (3/4) |
| 16 | Isolating elements on load bearing nut 11 |
| 16a-16c | Isolating elements on load bearing nut 11 |
| 17 | Hex attachment of nut 11 |
| 19 | Threaded outer circumference of nut 11 |
| 20, 20' | Transducer assemblies |
| 20a + 20b | Transducer pair |
| 21 | Casing of noise attenuating material |
| 22 | Load cylinder of 12 |
| 22a | Load cylinder of 12' |
| 23a, 23b | Wire connection to piezoelectric element 26 |
| 24 | Backing mass |
| 25a, 25b | Wire connection to electronics |
| 26 | Electroacoustic element |
| 27 | Wear face |
| 28 | Retaining ring for load bearing nut 11' |
| 29 | Washer for load bearing nut 11' |
| 30 | Fluid flow path |
| 32 | Channel in conduit or flow meter 100 |
| 35 | Path of acoustic wave energy from transducers |
| 40 | Conduit or flow meter wall |
| 41 | Cover for transducer assemblies |
| 100 | Ultrasonic flow meter |
| 110 | Recess for transducer 20 |

-continued

| Reference number | Element |
| --- | --- |
| 115 | Ledge of the recess 100 of the meter body 40 |

What is claimed is:

1. A transducer comprising:
a housing having an acoustically transparent window at a distal end thereof, the acoustically transparent window having an exterior surface configured to be exposed to process pressure when the transducer is mounted in a recess of an ultrasonic meter body;
an electroacoustic element positionable within the housing;
a plunger configured to apply a force on the electroacoustic element to urge the electroacoustic element to a position adjacent an interior surface of the acoustically transparent window;
a retaining nut disposed over a proximal end of the plunger, the retaining nut including an exterior threaded region configured to engage a threaded region of the recess; and
at least one isolation washer disposed over a proximal end of the plunger between the housing and the retaining nut, wherein the at least one isolation washer comprises isolating elements on a top surface that interrupt propagation of acoustic energy along paths outside a fluid flow through which the ultrasonic transducer is transmitting,
wherein the isolating elements comprise one or more of: annular ridges, annular ridges having evenly spaced crenels, radially extending ridges, radially extending ridges having evenly spaced crenels, protrusion evenly spaced apart radially, and protrusion evenly spaced apart annularly.

2. The transducer of claim 1, wherein the at least one isolation washer is composed of a metal.

3. The transducer of claim 1, wherein the retaining nut comprises isolating elements on a top surface that interrupt propagation of acoustic energy along paths outside the fluid flow through which the ultrasonic transducer is transmitting, wherein the top surface of the retaining nut is configured to face toward an acoustic window of the ultrasonic transducer, and wherein the at least one isolation washer is positioned between the retaining nut and the acoustic window.

4. The transducer of claim 3, wherein the at least one isolation washer and the retaining nut are each composed of a metal.

5. The transducer of claim 1, wherein the plunger includes a spring positioned on a distal end thereof, wherein attachment of the retaining nut over the proximal end of the plunger compresses the spring to provide the force on the electroacoustic element to urge the electroacoustic element to the position adjacent to the acoustically transparent window.

6. The transducer of claim 1, further comprising:
one or more standard washers composed of metal or polymeric material and absent the isolating elements, wherein the one or more standard washers are disposed over the proximal end of the plunger adjacent the one or more isolation washers, and
wherein the one or more standard washers and the one or more isolation washers are arranged in any order.

17 18

7. The transducer of claim 1, comprising two isolation washers each having a different thickness, arrangement of isolating elements, or a combination thereof.

8. The transducer of claim 1, further comprising:
a bushing positioned around an exterior circumference of the housing at a position adjacent the proximal end of the housing,
wherein the bushing forms a gas tight seal with an inner surface of the recess of the ultrasonic meter body and the exterior circumference of the housing.

9. The transducer of claim 1, wherein the retaining nut comprises:
a central longitudinal bore and a cavity defined by a region of the longitudinal bore at a bottom of the retaining nut having a larger inner diameter than the longitudinal bore, wherein the cavity is sized and shaped to receive a spring,
wherein attachment of a retaining ring on the proximal end of the plunger over the spring compresses the spring to provide the force on the electroacoustic element to urge the electroacoustic element to the position adjacent to the acoustically transparent window.

10. The transducer of claim 1, further comprising:
a bushing having a distal end positionable within an inner circumference of the housing at the proximal end thereof, and a proximal end positionable around an outer circumference of the plunger at the distal end thereof, the bushing forming a gas tight seal with an inner surface of the recess and the inner circumference of the housing.

11. An ultrasonic flow meter comprising transducer pairs positioned in operative relation to a fluid medium to transmit and receive acoustic wave energy through the fluid medium between transducers of the pair, wherein each transducer of a transducer pair comprises:
a housing having an acoustically transparent window at a distal end thereof, the acoustically transparent window having an exterior surface configured to be exposed to process pressure when the transducer is mounted in a recess of a meter body of the ultrasonic flow meter;
an electroacoustic element positionable within the housing;
a plunger configured to apply a force on the electroacoustic element to urge the electroacoustic element to a position adjacent an interior surface of the acoustically transparent window;
a retaining nut disposed over a proximal end of the plunger, the retaining nut including an exterior threaded region configured to engage a threaded region of the recess; and
at least one isolation washer disposed over a proximal end of the plunger between the housing and the retaining nut, wherein the at least one isolation washer comprises isolating elements on a top surface that interrupt propagation of acoustic energy along paths outside a fluid flow through which the ultrasonic transducer is transmitting,
wherein the isolating elements comprise one or more of: annular ridges, annular ridges having evenly spaced crenels, radially extending ridges, radially extending ridges having evenly spaced crenels, protrusion evenly spaced apart radially, and protrusion evenly spaced apart annularly.

12. The flow meter of claim 11, wherein the at least one isolation washer is composed of a metal.

13. The flow meter of claim 11, wherein the retaining nut comprises isolating elements on a top surface that interrupt propagation of acoustic energy along paths outside the fluid flow through which the ultrasonic transducer is transmitting, wherein the top surface of the retaining nut is configured to face toward an acoustic window of the ultrasonic transducer, and wherein the at least one isolation washer is positioned between the retaining nut and the acoustic window.

14. The flow meter of claim 13, wherein the at least one isolation washer and the retaining nut are each composed of a metal.

15. The flow meter of claim 11, wherein the plunger includes a spring positioned on a distal end thereof, wherein attachment of the retaining nut over the proximal end of the plunger compresses the spring to provide the force on the electroacoustic element to urge the electroacoustic element to the position adjacent to the acoustically transparent window.

16. The flow meter of claim 11, further comprising:
one or more standard washers composed of metal or polymeric material and absent the isolating elements,
wherein the one or more standard washers are disposed over the proximal end of the plunger adjacent the one or more isolation washers, and
wherein the one or more standard washers and the one or more isolation washers are arranged in any order.

17. The flow meter of claim 11, comprising two isolation washers each having a different thickness, arrangement of isolating elements, or a combination thereof.

18. The flow meter of claim 11, further comprising:
a bushing positioned around an exterior circumference of the housing at a position adjacent the proximal end of the housing,
wherein the bushing forms a gas tight seal with an inner surface of the recess of the ultrasonic meter body and the exterior circumference of the housing.

19. The flow meter of claim 11, wherein the retaining nut comprises:
a central longitudinal bore and a cavity defined by a region of the longitudinal bore at a bottom of the retaining nut having a larger inner diameter than the longitudinal bore, wherein the cavity is sized and shaped to receive a spring,
wherein attachment of a retaining ring on the proximal end of the plunger over the spring compresses the spring to provide the force on the electroacoustic element to urge the electroacoustic element to the position adjacent to the acoustically transparent window.

20. The flow meter of claim 11, further comprising:
a bushing having a distal end positionable within an inner circumference of the housing at the proximal end thereof, and a proximal end positionable around an outer circumference of the plunger at the distal end thereof, the bushing forming a gas tight seal with an inner surface of the recess and the inner circumference of the housing.

* * * * *